US012297795B1

(12) United States Patent
Schroeder et al.

(10) Patent No.: US 12,297,795 B1
(45) Date of Patent: May 13, 2025

(54) MULTI-FUNCTION FUEL INJECTOR VALVE IN DUAL FUEL SYSTEM AND FUEL SYSTEM OPERATING METHOD

(71) Applicant: Caterpillar Inc., Peoria, IL (US)

(72) Inventors: Eric L. Schroeder, Germantown Hills, IL (US); Dana R. Coldren, Secor, IL (US); Robert Graumüller, Kiel (DE); Kaushik Krishnamurthy, Manteno, IL (US); Dean C. Diers, Rapid City, SD (US); Lifeng Wang, Dunlap, IL (US); Jianhua Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/732,686

(22) Filed: Jun. 4, 2024

(51) Int. Cl.
*F02M 43/04* (2006.01)
*F02D 19/06* (2006.01)
*F02M 55/00* (2006.01)

(52) U.S. Cl.
CPC ......... *F02M 43/04* (2013.01); *F02D 19/0673* (2013.01); *F02D 19/0694* (2013.01); *F02M 55/008* (2013.01)

(58) Field of Classification Search
CPC .. F02M 43/04; F02M 55/008; F02D 19/0673; F02D 19/0694
See application file for complete search history.

(56) References Cited

U.S. PATENT DOCUMENTS

| | | | | |
|---|---|---|---|---|
| 4,736,712 | A * | 4/1988 | Savkar | F02M 43/04 123/304 |
| 5,526,791 | A | 6/1996 | Timmer et al. | |
| 8,628,031 | B2 | 1/2014 | Kiss | |
| 8,820,295 | B2 | 9/2014 | Coldren | |
| 9,140,224 | B2 | 9/2015 | Krishnaswamy et al. | |
| 11,384,721 | B1 | 7/2022 | Schroeder et al. | |
| 2019/0345881 | A1 * | 11/2019 | Stanbridge | F02D 41/0027 |

* cited by examiner

*Primary Examiner* — Jacob M Amick
*Assistant Examiner* — Charles J Brauch
(74) *Attorney, Agent, or Firm* — Brannon Sowers & Cracraft PC

(57) ABSTRACT

A fuel injector in a fuel system having a first fuel supply of a first fuel and a second fuel supply of a second fuel includes a multifunctional control valve movable in the fuel injector to control admission of the first fuel to a combined-fuel outlet passage, and to control a timing and an injection pressure of a fuel charge containing the first fuel. In an embodiment the first fuel includes a compression-ignition fuel such as diesel and the second fuel includes an alcohol fuel such as methanol. Related apparatus and methodology is disclosed.

19 Claims, 4 Drawing Sheets

MULTI-FUNCTION FUEL INJECTOR VALVE IN DUAL FUEL SYSTEM AND FUEL SYSTEM OPERATING METHOD

TECHNICAL FIELD

The present disclosure relates generally to a dual fuel system, and more particularly to a multifunctional control valve operable to admit a first fuel into a fuel injector to form a fuel charge and to control an injection timing and an injection pressure thereof.

BACKGROUND

Dual fuel engine systems have been known for decades. While traditional engine systems typically utilize a single fuel type such as diesel, gasoline, or natural gas, in a dual fuel engine system two different fuels each having different desirable properties are typically combusted together in an engine cylinder.

In one known strategy, a relatively small pilot charge of a compression-ignition fuel such as diesel is used to ignite a relatively larger main charge of a gaseous fuel such as natural gas. The diesel fuel is relatively easily ignited by way of an increased temperature and pressure in a cylinder, with the ignition of the diesel fuel triggering ignition of the more difficult to ignite gaseous fuel.

More recently, engineers have proposed dual liquid fuel strategies employing a leading fuel and a trailing fuel, both in a liquid form and injected as a single fuel charge. U.S. Pat. No. 11,384,721B1 proposes a strategy that may operate by injecting a first fuel and a second fuel from the same passage into an engine cylinder for combustion. While the '721 patent undoubtedly has practical applications, there is always room for improvement and development of alternative strategies.

SUMMARY

In one aspect, a fuel injector includes an injector housing forming a low-pressure fuel space, a first-fuel nozzle supply passage, a second-fuel nozzle supply passage, a combined-fuel outlet passage fluidly connected to both of the first-fuel nozzle supply passage and the second-fuel nozzle supply passage and extending to a plurality of nozzle outlets, and a nozzle check control cavity. The fuel injector further includes a nozzle check movable between a closed position blocking the plurality of nozzle outlets from the combined-fuel outlet passage, and an open position. The fuel injector also includes a control valve movable between a first position blocking the low-pressure fuel space from both the first-fuel nozzle supply passage and the nozzle check control cavity, and a second position at which the low-pressure fuel space is fluidly connected to both the first-fuel nozzle supply passage and to the nozzle check control cavity.

In another aspect, a fuel system includes a first fuel supply of a first fuel, a second fuel supply of a second fuel, and a fuel injector forming a low-pressure fuel space fluidly connected to the first fuel supply, a first-fuel nozzle supply passage, a second-fuel nozzle supply passage, a combined-fuel outlet passage extending to a plurality of nozzle outlets, and a nozzle check control cavity. The fuel injector further includes a control valve movable between a first position blocking the low-pressure fuel space from both the first-fuel nozzle supply passage and the nozzle check control cavity, and a second position at which the low-pressure fuel space is fluidly connected to both of the first-fuel nozzle supply passage and the nozzle check control cavity.

In still another aspect, a method of operating a fuel system includes feeding a first fuel to a first-fuel inlet of a fuel injector, feeding a second fuel to a second-fuel inlet of the fuel injector, and operating a control valve in the fuel injector to admit the first fuel to an outlet passage in the fuel injector. The method further includes pressurizing a fuel charge containing the first fuel in the outlet passage, and injecting the fuel charge via operating the control valve to relieve a closing hydraulic pressure on a nozzle check of the fuel injector.

DETAILED DESCRIPTION

Figure 1:
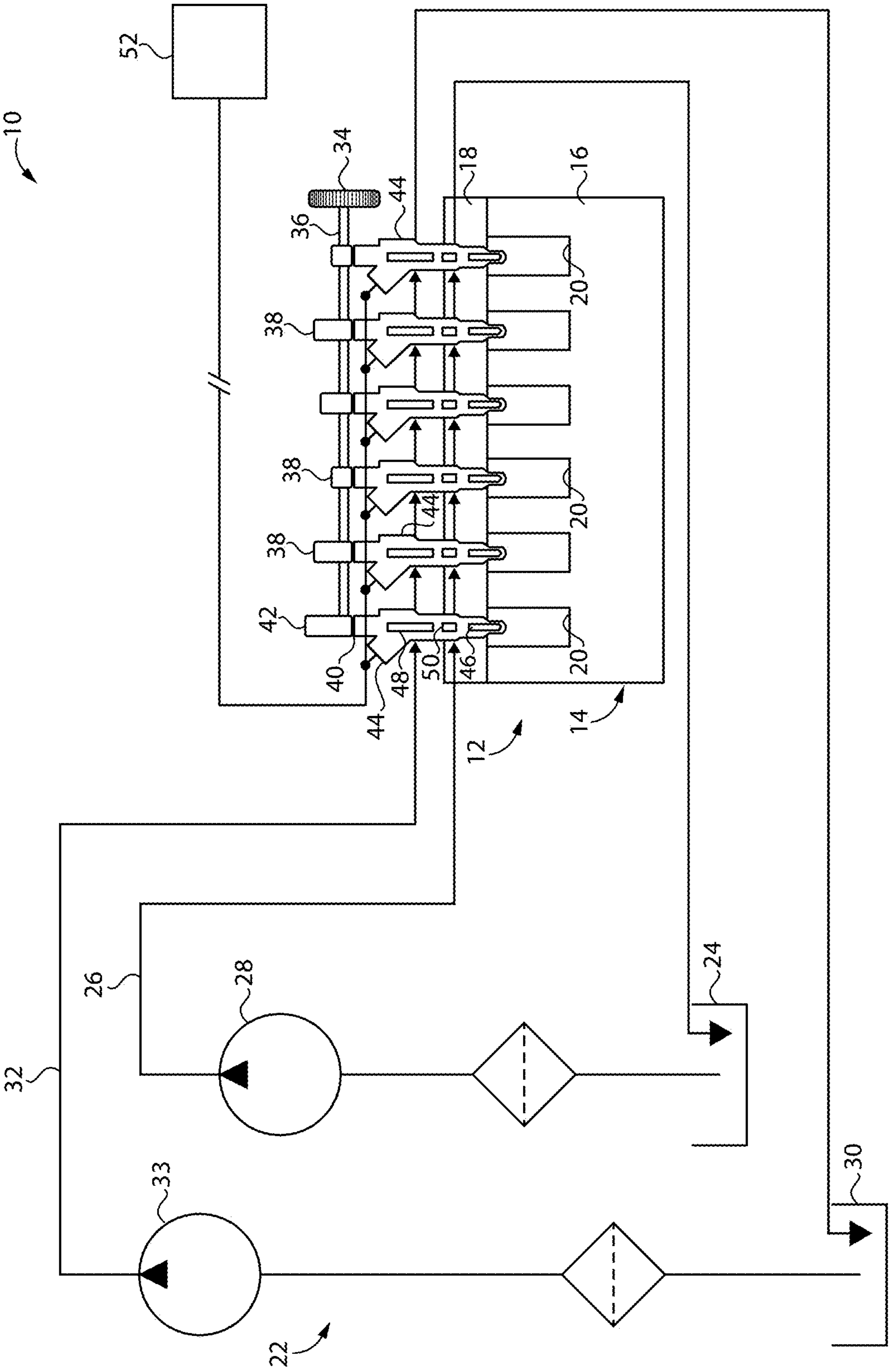
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14. Engine housing 14 includes a cylinder block 16 and a cylinder head 18 attached to cylinder block 16. A plurality of cylinders 20 are formed in cylinder block 16 and may include any number of cylinders in any suitable arrangement, such as an inline pattern, a V-pattern, or still another. Pistons will be conventionally positioned in cylinders 20 and movable between a top-dead-center position and a bottom-dead-center position in a generally conventional manner, typically in a 4-stroke engine cycle. Engine 12 can be applied for any known purpose including operating an electrical generator, a pump, a compressor, or a driveline in a land vehicle or a marine vessel to name a few examples. Engine 12 further includes a cam gear 34 in an engine geartrain coupled to a camshaft 36 having a plurality of cams 38 thereon. Each respective cam 38 may define a base circle 40 and a lobe 42 as further discussed herein.

Engine system 10 further includes a fuel system 22. Fuel system 22 may include a dual fuel system having a first fuel supply 24 of a first fuel, and at least one fuel pump 28 structured to feed the first fuel to a fuel supply conduit 26 extending to engine 12, namely, extending to cylinder head 18 in the illustrated embodiment. Fuel system 22 may also include a second fuel supply 30 of a second fuel, and at least one fuel pump 33 structured to convey the second fuel to a second fuel supply conduit 32 extending to engine 12. The first fuel may be supplied at a relatively higher pump outlet pressure and the second fuel may be supplied at a relatively lower pump outlet pressure, although the present disclosure is not thereby limited.

In an embodiment, the first fuel may include a suitable compression-ignition fuel, such as a liquid diesel distillate fuel. Alternatives might include a higher-octane fuel blended with a cetane enhancer, dimethyl ether, biodiesel, or various others including fuel blends. The second fuel may include a higher-octane fuel such as an alcohol fuel. Methanol and various methanol blends provide a practical implementation strategy, although alternatives such as gasoline and others including various blends are within the scope of the present disclosure.

Fuel system 22 also includes a plurality of fuel injectors 44. Fuel injectors 44 may extend into each respective one of cylinders 20, thus will be understood as direct fuel injectors. Each of fuel injectors 44, hereinafter referred to, at times, in the singular, may include various internal components including a nozzle check 46, a fuel pressurization plunger 48, and a valve assembly 50. As will be further apparent from the following description, fuel injectors 44 are structured to form and inject a fuel charge comprised of the first fuel as a leading fuel, and the second fuel as a trailing fuel. The first fuel in a combined fuel charge may have a relatively smaller quantity and compression-ignites in the corresponding cylinder 20 to trigger ignition of a relatively larger quantity of the second fuel according to known principles. Fuel system 22 and fuel injectors 44 may also be structured to inject a fuel charge consisting entirely or at least predominantly of the first fuel, such as in a so-called diesel-only mode.

Plungers 48 are illustrated as cam-actuated, however, in other embodiment a different fuel pressurization strategy such as hydraulic actuation of a plunger might be used. Fuel system 22 also includes an electronic control unit or ECU 52 including a suitable computerized controller and machine readable memory, structured to electronically control fuel injectors 44 and potentially monitor and/or control other operating parameters of fuel system 22 and/or engine system 10 more generally. As will be further apparent from the following description, each of fuel injectors 44 may be uniquely configured to control fuel admission and fuel charge formation as well as a timing, potentially a manner such as a rate shape, and a pressure of an injected fuel charge.

Figure 2:
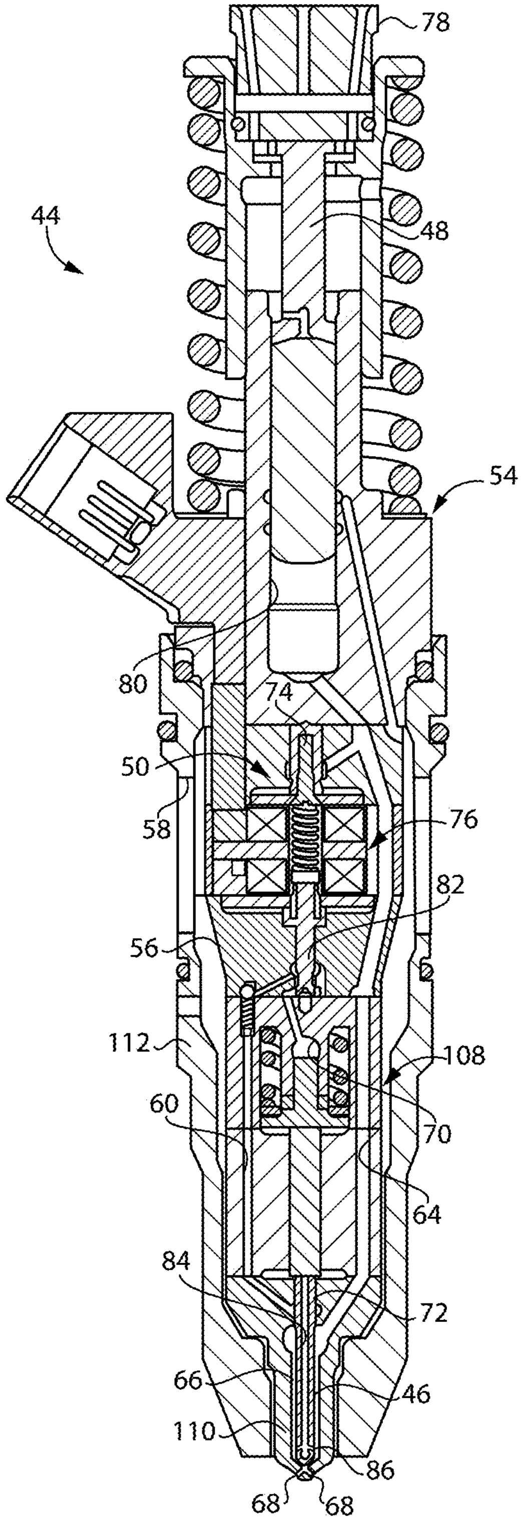
FIG. 2 is a sectioned side diagrammatic view of a fuel injector, according to one embodiment.
Figure 3:
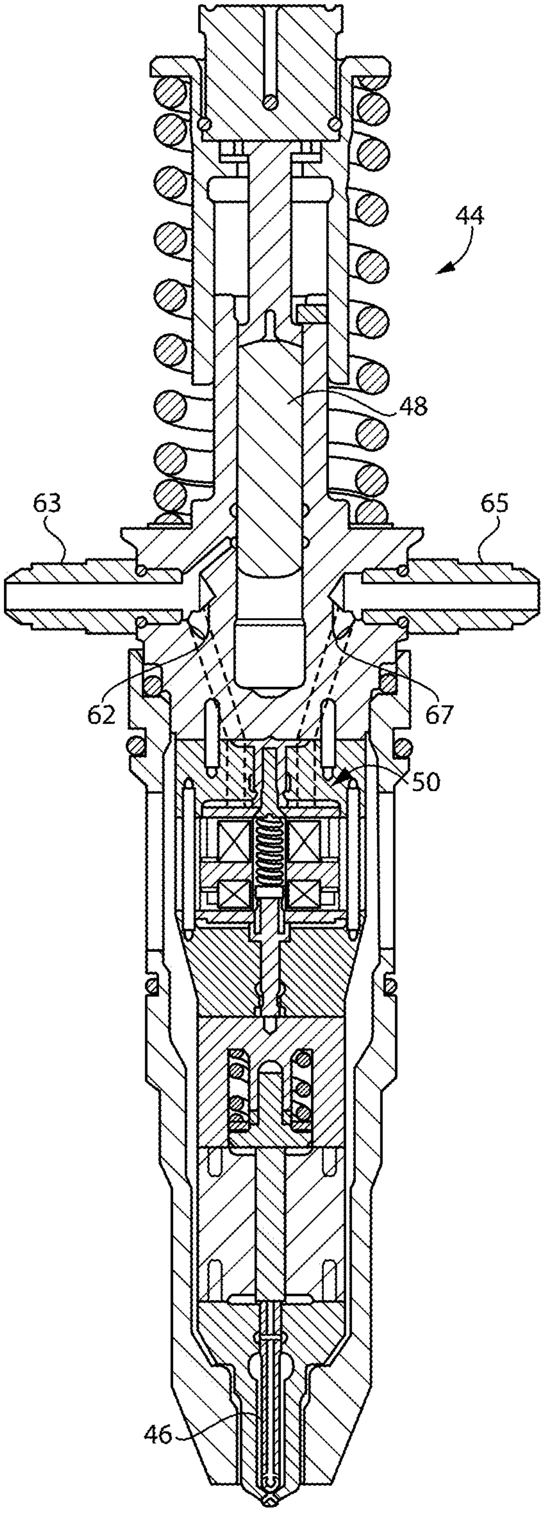
FIG. 3 is another sectioned side diagrammatic view of a fuel injector as in FIG. 2.
Figure 4:
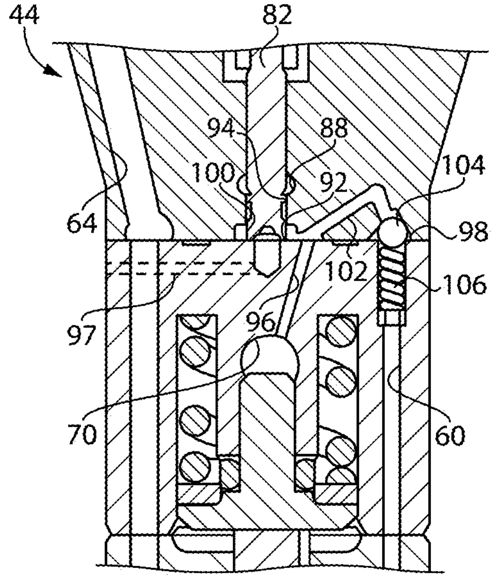
FIG. 4 is a sectioned side diagrammatic view of a portion of a fuel injector as in FIGS. 2 and 3.
Figure 6:
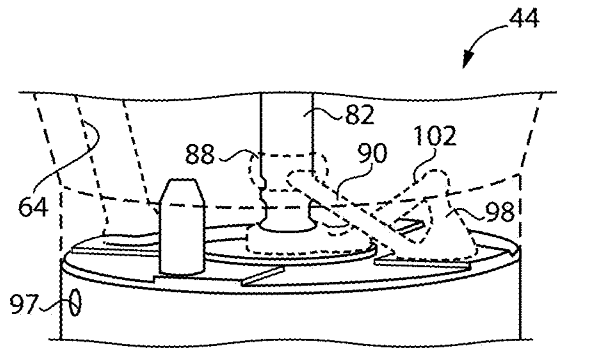
FIG. 6 is a diagrammatic view of a portion of a fuel injector as in FIGS. 2 and 3.
Figure 5:
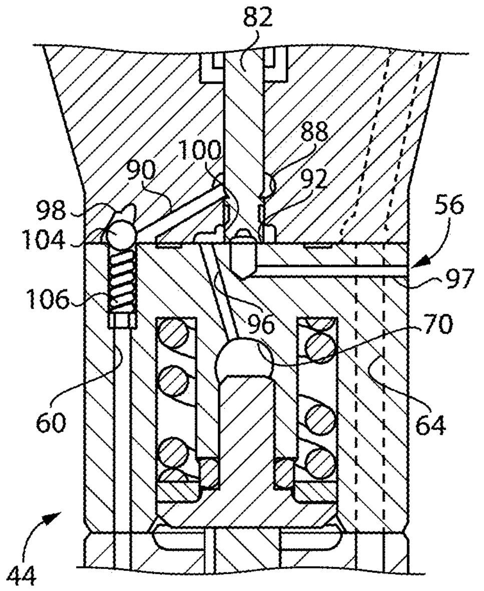
FIG. 5 is another sectioned side diagrammatic view of a portion of a fuel injector as in FIGS. 2 and 3.
Figure 7:
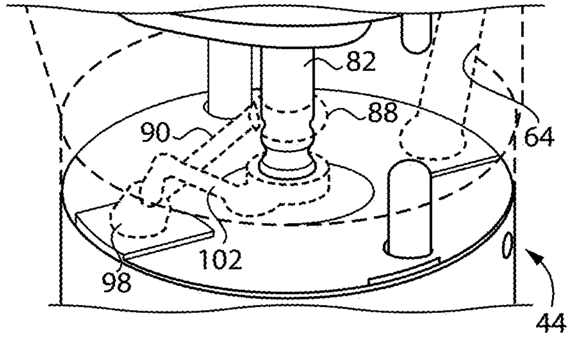
FIG. 7 is another diagrammatic view of a portion of a fuel injector as in FIGS. 2 and 3.

Referring also now to FIGS. 2 and 3, fuel injector 44 includes an injector housing 54 forming a low-pressure fuel space 56 fluidly connected to a first-fuel inlet 58 receiving a feed of the first fuel from fuel supply conduit 26. Injector housing 54 further forms a first-fuel nozzle supply passage 60, a second-fuel inlet 62 that receives a feed of the second fuel from fuel supply conduit 32, and a second-fuel nozzle supply passage 64. In the illustrated embodiment a first fitting 63 forms or fluidly connects to second-fuel inlet 62, and a second fitting 65 receives an outlet feed of the second fuel via a second-fuel outlet 67 for returning to second fuel supply 30.

Injector housing 54 further forms a combined-fuel outlet passage 66 fluidly connected to both of first-fuel nozzle supply passage 60 and second-fuel nozzle supply passage 64. Combined-fuel outlet passage 66 extends to a plurality of nozzle outlets 68 fluidly connected to a corresponding cylinder 20. Injector housing 54 further forms a nozzle check control cavity 70. A nozzle check 72 is movable in injector housing 54 between a closed position blocking nozzle outlets 68 from combined-fuel outlet passage 66, and an open position at which nozzle outlets 68 are fluidly connected to combined-fuel outlet passage 66. In the illustrated embodiment, first-fuel nozzle supply passage 60 extends through nozzle check 72, with nozzle check 72 forming a plurality of transfer holes 86 fluidly connected to a passage segment 84 of first fuel nozzle supply passage 60 and fluidly connected to combined-fuel outlet passage 66.

Providing the first fuel through first-fuel nozzle supply passage 60 and through transfer holes 86 to combined-fuel outlet passage 66 can displace some second fuel resident in combined-fuel outlet passage 66 to form a segmented combined fuel charge of the first fuel leading and the second fuel trailing as discussed herein. In the so-called diesel only mode, admitting the first fuel to combined-fuel outlet passage 66 can displace enough of the second fuel to form a fuel charge entirely of the first fuel when desired.

As noted above, valve assembly 50 is within injector housing 54. In the illustrated embodiment, valve assembly 50 includes a spill valve 74 and an electrical actuator subassembly 76, such as a solenoid actuator subassembly. Injector housing 54 further forms a plunger cavity 80. Spill valve 74 is movable between a closed position blocking plunger cavity 80 from second-fuel inlet 62, and an open position. Plunger 48 is coupled, directly or indirectly, to a tappet 78 contacted by a corresponding one of cams 38. Plunger 48 may include a plurality of coupled together parts not physically attached, although the present disclosure is not thereby limited and plunger 48 could be connected to tappet 78 so as to reciprocate directly based upon the motion of tappet 78. Also in the illustrated embodiment, plunger cavity 80 is fluidly connected via second-fuel nozzle supply passage 64, combined-fuel-outlet passage 66, and first-fuel nozzle supply passage 60, via control valve 82 to nozzle check control cavity 70. Those skilled in the art will be familiar with direct hydraulic control of a nozzle check wherein a closing hydraulic pressure is applied to a nozzle check to maintain the nozzle check in a closed position, and then selectively released to enable pressurized fuel within a fuel injector to urge open the nozzle check to commence a fuel injection. When ending of the fuel injection is desired the closing hydraulic pressure can be increased to urge the nozzle check closed. As suggested above, fuel injector 44 is uniquely configured for control of admission of the first fuel as well as controlling an injection timing and an injection pressure of fuel injection of a fuel charge that includes both the first fuel and the second fuel or substantially only one of the first fuel or the second fuel.

Referring now also to FIGS. 4-8, fuel injector 44 includes a control valve 82 movable between a first position blocking low-pressure fuel space 56 from both first-fuel nozzle supply passage 60 and nozzle check control cavity 70, and a second position at which low-pressure fuel space 56 is fluidly connected to both first-fuel nozzle supply passage 60 and to nozzle check control cavity 70. The described structure enables control valve 82, at times, to open low-pressure fuel space 56 to first-fuel nozzle supply passage 60 to admit the first fuel to combined-fuel outlet passage 66 to be injected, while at other times establishing fluid communication between low-pressure fuel space 56 and nozzle check control cavity 70 to selectively relieve hydraulic pressure of the first fuel in nozzle check control cavity 70 to permit nozzle check 72 to be opened.

It will be recalled plunger cavity 80 fluidly connects to nozzle check control cavity 70. When plunger 48 is advancing to increase fuel pressure in fuel injector 44, and spill valve 74 is closed, the increased and increasing fuel pressure can be supplied to nozzle check control cavity 70, maintaining nozzle check 72 closed until such time as control valve 82 is operated to fluidly connect nozzle check control cavity 70 to low-pressure fuel space 56 and start injection. This feature allows control valve 82 to be selectively opened when a desired injection pressure in fuel injector 44 is reached.

As also shown in the attached drawings, injector housing 54 forms a fuel annulus 88 extending circumferentially around control valve 82. A fuel passage 90 extends between fuel annulus 88 and first-fuel nozzle supply passage 60. Injector housing 54 also forms a cavity 98. Cavity 98 is fluidly connected to fuel annulus 88, to first-fuel nozzle supply passage 60, and to a second fuel passage 102 that connects to nozzle check control cavity 70 via valve 82. Injector housing 54 also forms a valve seat 92. A clearance 94 is defined between control valve 82 and injector housing 54 when control valve 82 is at the first position and fluidly connects fuel annulus 88 to nozzle check control chamber 70. A pressure control passage 96 extends to nozzle check control cavity 70. A first-fuel inlet-outlet passage 97 fluidly connects between valve seat 92 and low-pressure fuel space 56.

In an embodiment, valve seat 92 includes a lower valve seat, and fuel injector 44 further forms an upper valve seat 100, contacted by control valve 82 at the second position. Fuel annulus 88 may be continuously fluidly connected to first-fuel nozzle supply passage 60 and blocked from pressure control passage 96 when control valve 82 contacts upper valve seat 100 at the second position, as further discussed below. A second fuel passage 102 extends between valve seat 92 and first-fuel nozzle supply passage 60. Fuel injector 44 may further include a check valve 104 movable in three-way cavity 98 to a closed position blocking first-fuel nozzle supply passage 60 from low-pressure fuel space 56. A spring biaser 106 may be provided to bias check valve 104 towards the closed position. In some embodiments, a biaser for check valve 104 is omitted.

Figure 8:
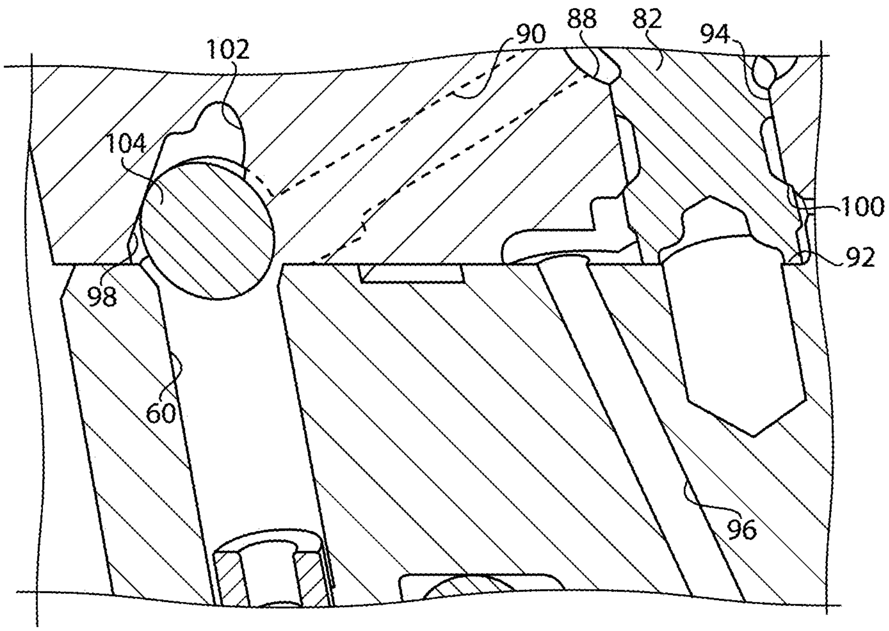
FIG. 8 is a sectioned diagrammatic view, in perspective, of a portion of a fuel injector as in FIGS. 2 and 3.

Focusing on FIG. 8, there is shown check valve 104 approximately as it might appear in the closed position, blocking fluid communication between first-fuel nozzle supply passage 60 and second fuel passage 102. In the closed position of check valve 104, however, fluid communication is maintained between first-fuel nozzle supply passage 60 and fuel passage 90 extending to fuel annulus 88. As such, an increased pressure in plunger cavity 80 during fuel pressurization can be communicated by way of fuel passage 90 and fuel annulus 88 through clearance 94 to pressure control passage 96 so long as control valve 82 remains in the first position. Check valve 104 may move to the closed position in response to an increased pressure in first-fuel nozzle supply passage 60. Fluid communication between first-fuel nozzle supply passage 60 and second fuel passage 102 is nevertheless blocked, preventing the increased fuel pressure from ultimately being communicated back through inlet-outlet passage 97.

In the illustrated embodiment, injector housing 54 includes a stack of clamped together components including a tip piece 110 forming nozzle outlet 68, positioned in an injector case 112. Low-pressure fuel space 56 is thus defined between stack 108 and case 112. It should be appreciated that a low-pressure fuel space could be otherwise defined including any fuel space not continuously fluidly connected to nozzle check control cavity 70 and into which fuel pressure can be relieved. Also, valve assembly 50 is depicted integrating spill valve 74 and control valve 82. In other embodiments these parts could be separated to different locations in a fuel injector, or even potentially located outside of a fuel injector.

INDUSTRIAL APPLICABILITY

Operating fuel system 22 and engine system 10 according to the present disclosure can include feeding the first fuel to first-fuel inlet 58, and feeding the second fuel to second-fuel inlet 62. Control valve 82 can be operated to admit the first fuel to combined-fuel outlet passage 66 as discussed herein. A fuel charge containing the first fuel can be pressurized by way of plunger 48 in combined-fuel outlet passage 66. The fuel charge can be injected via operating control valve 82 again to relieve a closing hydraulic pressure on nozzle check 72. In an embodiment, the first fuel may be fed to fuel injector 44 at a higher pressure than the second fuel is fed to fuel injector 44. The at least modestly higher pressure of the first fuel can assist in the first fuel displacing the second fuel in combined-fuel outlet passage 66.

It has been determined that certain of the events described in connection with operating fuel system 22 and fuel injector 44 can take place at optimized timings. It will be appreciated, for example, that the first fuel cannot be practicably admitted into the fuel injector when internal fuel pressures are high, such as when plunger 48 is advancing and spill valve 74 is closed. In an embodiment, control valve 82 is operated to admit the first fuel when a cam 38 contacts tappet 78 coupled to plunger 48 on the base circle 40 of cam 38 and/or when plunger 48 is retracting. With cam 38 contacting tappet 78 on base circle 40 the second fuel within fuel injector 44 is relatively quiescent and readily and controllably displaced by the admitted first fuel. Operating control valve 82 to relieve closing hydraulic pressure on nozzle check 70 can include operating control valve 82 when cam 38 contacts tappet 78 via lobe 42. Thus, when tappet 78 is being urged down by cam lobe 42 and fuel pressure is increasing in fuel injector 44, control valve 82 is opened at a desired timing corresponding to a desired fuel injection pressure.

Figure 9:
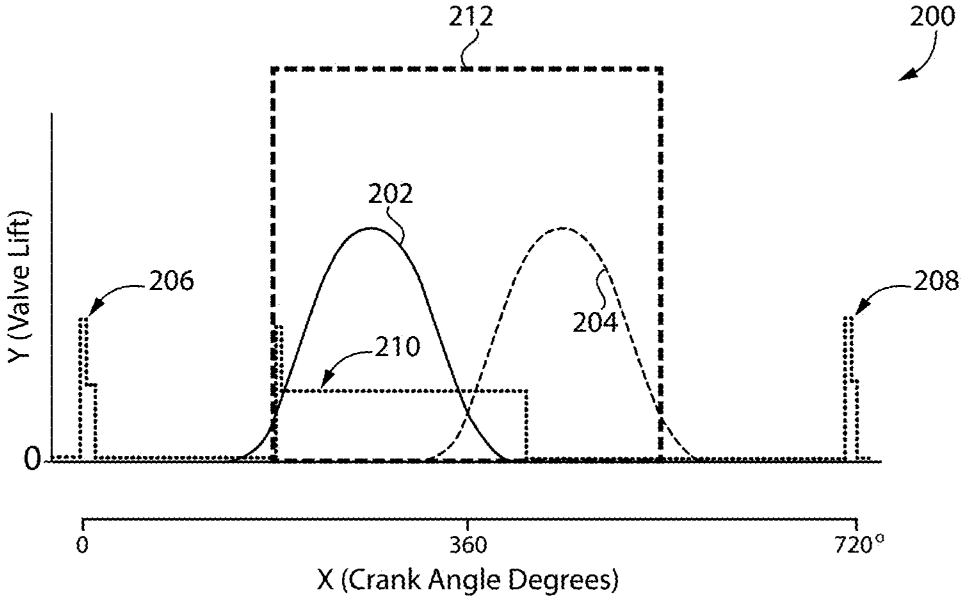
FIG. 9 is a graph illustrating fuel system and engine events during an engine cycle, according to one embodiment.

Referring now to FIG. 9, there is shown a graph 200 illustrating crank angle degrees on the X-axis and valve lift on the Y-axis. Exhaust valve opening and closing is shown in a trace 202, and intake valve opening and closing is shown in a trace 204. A first fuel injection 206 might occur approximately at a top-dead-center position of a corresponding piston in an engine cycle, followed by an expansion stroke until exhaust valve opening 202 commences. Another fuel injection event 208 is shown subsequently. A fuel admission event is shown at trace 210 corresponding to a range of engine crank angle timing when the exhaust valve is open and subsequently the intake valve is open and the associated cam is rotating on base circle. A fuel admission window, or metering range, is shown approximately via the dashed box 212. It can thus be appreciated that between fuel injection events there is a metering range 212 that permits a variable and controllable amount of the first fuel to be admitted to form a combined fuel charge or a single fuel charge in fuel injector 44.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel injector comprising:

an injector housing forming a low-pressure fuel space, a first-fuel nozzle supply passage, a second-fuel nozzle supply passage, a combined-fuel outlet passage fluidly connected to both of the first-fuel nozzle supply passage and the second-fuel nozzle supply passage and extending to a plurality of nozzle outlets, and a nozzle check control cavity;

a nozzle check movable between a closed position blocking the plurality of nozzle outlets from the combined-fuel outlet passage, and an open position at which the plurality of nozzle outlets are fluidly connected via the combined-fuel outlet passage to both the first-fuel nozzle supply passage and the second-fuel nozzle supply passage; and a control valve movable between a first position blocking the low-pressure fuel space from both the first-fuel nozzle supply passage and the nozzle check control cavity, and a second position at which the low-pressure fuel space is fluidly connected to both the first-fuel nozzle supply passage and to the nozzle check control cavity.

2. The fuel injector of claim 1 wherein the first-fuel nozzle supply extends through the nozzle check to a plurality of transfer holes fluidly connected to the combined-fuel outlet passage.

3. The fuel injector of claim 2 wherein the injector housing forms a second-fuel inlet, and a plunger cavity, and the fuel injector further includes a spill valve movable between a closed position blocking the plunger cavity from the second-fuel inlet, and an open position.

4. The fuel injector of claim 3 wherein the plunger cavity is fluidly connected via the second-fuel nozzle supply passage, the combined-fuel outlet passage, and the first-fuel nozzle supply passage, to the nozzle check control cavity.

5. The fuel injector of claim 1 wherein the injector housing forms a fuel annulus extending around the control valve, a fuel passage extending between the fuel annulus and the first-fuel nozzle supply passage, and a valve seat.

6. The fuel injector of claim 5 wherein a clearance is defined between the control valve and the injector housing when the control valve is at the first position and fluidly connects the fuel annulus to the nozzle check control chamber.

7. The fuel injector of claim 5 wherein the injector housing forms a second fuel passage extending between the valve seat and the first-fuel nozzle supply passage, and further comprising a check valve movable in response to an increase in pressure in the first-fuel nozzle supply passage to a closed position blocking the second fuel passage from the first-fuel nozzle supply passage.

8. The fuel injector of claim 7 further comprising a biaser biasing the check valve toward the closed position.

9. The fuel injector of claim 5 wherein the injector housing forms a first-fuel inlet-outlet passage fluidly connecting between the valve seat and the low-pressure fuel space.

10. A fuel system comprising:

a first fuel supply of a first fuel;

a second fuel supply of a second fuel;

a fuel injector forming a low-pressure fuel space fluidly connected to the first fuel supply, a first-fuel nozzle supply passage, a second-fuel nozzle supply passage, a combined-fuel outlet passage extending to a plurality of nozzle outlets, and a nozzle check control cavity; and the fuel injector further including a control valve movable between a first position blocking the low-pressure fuel space from both the first-fuel nozzle supply passage and the nozzle check control cavity, and a second position at which the low-pressure fuel space is fluidly connected to both of the first-fuel nozzle supply passage and the nozzle check control cavity; and the fuel injector further including a valve seat, and the control valve is in contact with the valve seat at the first position.

11. The fuel system of claim 10 wherein the fuel injector forms a fuel annulus extending around the control valve, and a cavity fluidly connected to the fuel annulus, to the first-fuel nozzle supply passage, and to the nozzle check control cavity by way of the control valve.

12. The fuel system of claim 11 wherein the fuel injector further includes a check valve movable in the cavity to a closed position blocking the first-fuel nozzle supply passage from the low-pressure fuel space.

13. The fuel system of claim 10 wherein the fuel injector further includes a nozzle check, and the first-fuel nozzle supply passage extends through the nozzle check.

14. The fuel system of claim 10 wherein:

the fuel injector forms a second-fuel inlet fluidly connected to the second fuel supply, and a plunger cavity fluidly connected to the second-fuel nozzle supply passage; and the fuel injector further includes a plunger movable in the plunger cavity from a retracted position to an advanced position to pressurize a combined fuel charge in the combined-fuel outlet passage containing the first fuel admitted via the control valve and the second fuel admitted through the plunger cavity.

15. The fuel system of claim 10 wherein the valve seat includes a lower valve seat, and the fuel injector further forms an upper valve seat contacted by the control valve at the second position, and a clearance defined around the control valve at the first position and fluidly connecting the nozzle check control cavity to the first-fuel nozzle supply passage.

16. A method of operating a fuel system comprising:

feeding a first fuel to a first-fuel inlet of a fuel injector;

feeding a second fuel to a second-fuel inlet of the fuel injector;

operating a control valve in the fuel injector to admit the first fuel to an outlet passage in the fuel injector;

pressurizing a fuel charge containing the first fuel in the outlet passage, including increasing a pressure of the fuel charge to an injection pressure in the outlet passage; and injecting the fuel charge via operating the control valve to relieve a closing hydraulic pressure on a nozzle check of the fuel injector.

17. The method of claim 16 wherein the outlet passage fluidly connects to a passage segment extending through a nozzle check of the fuel injector, and the fuel charge contains the first fuel as a leading fuel and the second fuel as a trailing fuel within the outlet passage.

18. The method of claim 16 further comprising moving a check valve in the fuel injector to a closed position blocking the outlet passage from the first fuel supply, in response to the pressurizing the fuel charge.

19. The method of claim 16 wherein:

the feeding the first fuel includes feeding the first fuel at a higher pressure;

the feeding the second fuel includes feeding the second fuel at a lower pressure;

the pressurizing the fuel charge includes advancing a plunger in a plunger cavity;

the operating the control valve to admit the first fuel further includes operating the control valve when a cam contacts a tappet coupled to the plunger on a base circle of the cam or when the plunger is retracting; and the operating the control valve to relieve the closing hydraulic pressure further includes operating the control valve when the cam contacts the tappet on a lobe of the cam and the plunger is advancing.

* * * * *